United States Patent
Huang (10) Patent No.: US 9,552,482 B2
(45) Date of Patent: Jan. 24, 2017

(54) METHOD FOR DETERMINING DEBUG AUTHORIZATION FOR MOTHERBOARD CONTROL MODULE AND ASSOCIATED MOTHERBOARD CONTROL MODULE

(71) Applicant: MStar Semiconductor, Inc., Hsinchu Hsien (TW)

(72) Inventor: Chien-Hsing Huang, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 17 days.

(21) Appl. No.: 14/225,515

(22) Filed: Mar. 26, 2014

(65) Prior Publication Data
US 2014/0298031 A1    Oct. 2, 2014

(30) Foreign Application Priority Data
Mar. 29, 2013    (TW) .............. 102111514 A (51) Int. Cl.
  *G06F 21/57*    (2013.01)
  *G06F 21/71*    (2013.01)
  *H04L 9/32*     (2006.01)

(52) U.S. Cl.
  CPC .............. *G06F 21/57* (2013.01); *G06F 21/71* (2013.01); *G06F 2221/2105* (2013.01); *H04L 9/3247* (2013.01); *H04L 2209/127* (2013.01)

(58) Field of Classification Search
  CPC .......... G06F 21/44; G06F 21/57; G06F 21/73; H04L 2209/127; H04L 9/3247
  See application file for complete search history.

(56) References Cited

U.S. PATENT DOCUMENTS

| | | | | |
|---|---|---|---|---|
| 2002/0186838 A1* | 12/2002 | Brandys | ......................... | 380/30 |
| 2003/0005335 A1* | 1/2003 | Watanabe | ..................... | 713/202 |
| 2005/0268174 A1* | 12/2005 | Kumagai | ........................ | 714/38 |
| 2007/0101081 A1* | 5/2007 | Kwon | .......................... | 711/163 |
| 2008/0115108 A1* | 5/2008 | Gunji | .................. | G06F 11/3656 717/124 |
| 2009/0217054 A1* | 8/2009 | Haider | ......................... | 713/189 |
| 2009/0307783 A1* | 12/2009 | Maeda | ................ | G06F 11/3648 726/30 |
| 2013/0047250 A1* | 2/2013 | Kothari | .......................... | 726/16 |

* cited by examiner

*Primary Examiner* — Robert Leung
(74) *Attorney, Agent, or Firm* — Edell, Shapiro & Finnan, LLC (57) ABSTRACT

By comparing a chip unique password, certification for activating a debug function can be established on the chip unique password. Thus, even when the chip unique password is lost due to negligence, not only certification for activating debugging on other motherboards of the same model number can remain unaffected, but also risks caused by replacing a chip or by a private key leakage from a system manufacturer are eliminated.

20 Claims, 6 Drawing Sheets

METHOD FOR DETERMINING DEBUG AUTHORIZATION FOR MOTHERBOARD CONTROL MODULE AND ASSOCIATED MOTHERBOARD CONTROL MODULE

This application claims the benefit of Taiwan application Serial No. 102111514, filed Mar. 29, 2013, the subject matter of which is incorporated herein by reference.

BACKGROUND OF THE INVENTION

Field of the Invention

The invention relates in general to a method for determining debug authorization for a motherboard control module and an associated motherboard control module, and more particularly, to a method for determining debug authorization that determines whether a debug function on a motherboard control module can be activated according to a characteristic match of a chip unique password, and an associated motherboard control module using the method.

Description of the Related Art

When designing chips of a next generation, numerous back-and-forth exchanges regarding the chips are carried out between a motherboard manufacturer (i.e., an integrated circuit design house) and different system manufacturers. During these exchanges, the motherboard manufacturer performs debugging on a flash memory of a motherboard control module, whereas the system manufacturers handle customizations of different data regions (i.e., different modules) of the flash memory. However, debugging on the flash memory face many challenges.

Before a processor start booting with a secure startup chip, a boot code burned in the chip demands a public key pre-published by a system manufacturer to first authenticate a digital signature included in a data block of a flash memory, so as to ensure that the digital signature is generated from encrypting contents of the data block using a corresponding private key by the system manufacturer. Having successfully authenticated the digital signature generated from the private key, the processor then proceeds to an actual boot procedure. It should be noted that, each time data contents of data block of the flash memory are altered, the altered data contents lose their certification as the altered data contents are not encrypted. Further, a debug process of the flash memory needs to be performed under the premise that the digital signature is approved by the foregoing authentication procedure. As a result, when a motherboard manufacturer, after retrieving a motherboard from a system manufacturer, is to perform debugging on the motherboard that is previously manufactured and customized by the system manufacturer, the flash memory may be rejected from debugging, or certification of the flash memory may not be supported due to the lack of a successful authentication although the flash memory is allowed for debugging.

In order to solve the above issues and to perform debugging, after receiving the packaged motherboard from the system manufacturer, common approaches employed by the motherboard manufacturer include the following. In a first method, an original chip is replaced by another chip, which requires no encryption verification by the private key and is burned with the same data as the original chip, so that the verification procedure of the flash memory can be skipped while the data contents of the chip are substantially unchanged. In a second method, the private key for encryption when updating the data contents of the flash memory is obtained from the system manufacturer, and the private key is then utilized for the verification procedure of the flash memory to accordingly perform the subsequent debugging. From manual control procedure perspectives, both of the first and second methods are not only complicated but also tremendously risky due to manual factors involved. For example, in the first method, assume that the replacement chip is burned with a malicious code that illegally accesses and spreads the above digital signature. Since other motherboards of the same model number fabricated by the motherboard manufacturer can also be verified through the same digital signature, with the leaked digital signature, the motherboards of the same model number may be evil-mindedly tampered with the lack of security protection provided by the digital signature. For another example, in the second method, assuming the private key is exposed during a dispatch process of the private key from the system manufacturer to the motherboard manufacturer, the security of motherboards of the same model becomes completely void due to the leaked and abused private key. Consequently, whether to activate debugging of a motherboard faces a dilemma due to security reasons.

SUMMARY OF THE INVENTION

To solve the above security issue of a digital signature for a debug function of a motherboard, the invention is directed to a method for determining debug authorization for a motherboard control module and a motherboard control module using the method.

According to an embodiment of the present invention, a method for determining debug authorization for a motherboard control module is provided. The motherboard control module comprises a chip and a flash memory. The chip stores a device identity of the motherboard control module. The flash memory comprises a plurality of data regions. The method comprises: obtaining a corresponding chip unique password according to the device identity and a data region identity of a first data region of the data regions; comparing a characteristic of the chip unique password with a first chip unique reference code stored in the first data region, and deactivating a digital signature authentication mechanism to authorize an execution of debugging when the characteristic of the chip unique password matches the first chip unique reference code.

According to another embodiment of the present invention, a method for determining debug authorization for a motherboard control module is provided. The motherboard control module comprises a chip and a flash memory. The chip stores a device identity of the motherboard control module. The flash memory comprises a plurality of data regions. The method comprises: obtaining a corresponding chip unique password according to the device identity and a data region identity of a first data region of the data regions; comparing a characteristic of the chip unique password with a first chip unique reference code stored in the first data region, and encrypting the first data region by an exclusive proprietary private key of a motherboard manufacturer of the motherboard control module when the characteristic of the chip unique password matches the first chip unique reference code to generate a digital signature; transmitting the digital signature to a system manufacturer, and waiting to receive a debug approval corresponding to the digital signature from the system manufacturer; and deactivating a digital signature authentication mechanism of the flash memory to authorize an execution of debugging of the flash memory after receiving the debug approval.

According to an alternative embodiment of the present invention, a motherboard control module is provided. The motherboard control module comprises a chip, a flash memory and a controller. The chip stores a device identity of the motherboard control module. The flash memory comprises a plurality of data regions. The controller accesses the device identity from the chip, obtains a corresponding chip unique password according to the device identity and a data region identity of a first data region of the data regions, compares a characteristic of the chip unique password with a first chip unique reference password stored in the first data region, and authorizes an execution of debugging when the chip unique password matches the first chip unique reference password.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
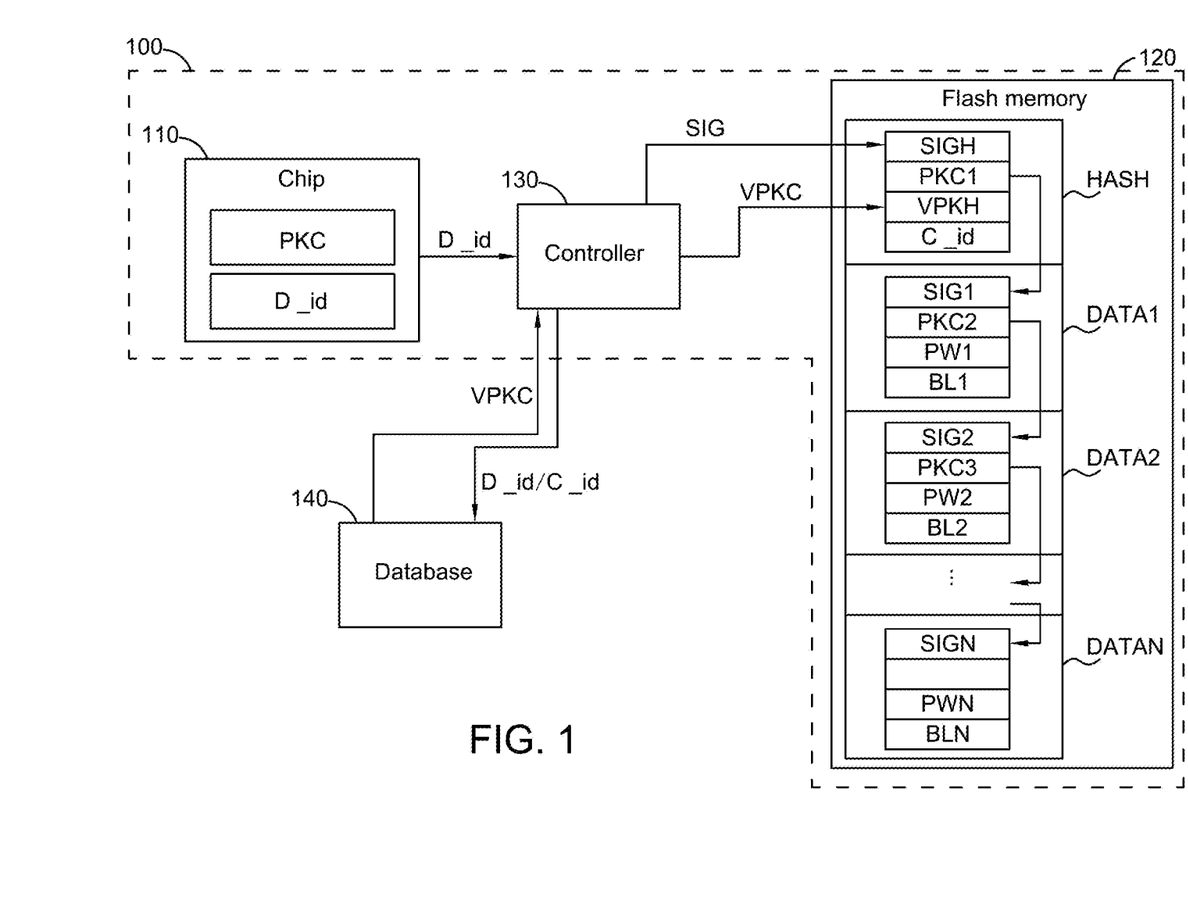
FIGS. 1 to 4 are schematic diagrams of a motherboard control module determining whether to activate a digital signature authentication mechanism of a flash memory of the motherboard control module and to authorize a debug function of the flash memory according to embodiments of the present invention.

FIG. 1 shows schematic diagram of a motherboard control module 100 according an embodiment of the present invention. The motherboard control module 100 determines whether to deactivate a digital signature authentication mechanism of a flash memory 120 of the motherboard control module 100 and to authorize an execution of a debug function of the flash memory 120. As shown in FIG. 1, the motherboard control module 100 comprises a chip 110, a controller 130 and a flash memory 120.

The flash memory 120 comprises a plurality of data regions HASH, DATA1, DATA2, . . . , and DATAN, each of which is independently customized at a system manufacture. Certification of digital signatures of the data regions HASH, DATA1, DATA2, . . . , and DATAN are dependent in a sequential and transitive manner. For example, certification of a first digital signature SIG1 of the data region DATA1 is established on a digital signature SIGH of the data region HASH, a digital signature SIG2 of the data region DATA2 is established on the digital signature SIG1 of the data region DATA1, and so forth. The data region HASH serves as a predetermined digital signature authentication region of the flash memory 120. In principle, each of the data regions stores a digital signature, a public key for certification of the adjacently lower data region, a chip unique reference password, and a device identity of a corresponding motherboard manufacturer or a data region identity designated by a system manufacturer. For example, the data region HASH stores a digital signature SIGH, a public key PKC1 for certification of the adjacently lower data region DATA1, a chip unique reference password VPKH dedicated to the motherboard manufacturer, and a device identity C_id dedicated to the motherboard manufacturer. The digital signature SIGH is generated from encrypting an entire block of the data region HASH by an exclusive proprietary private key of the motherboard manufacturer. Similarly, the data region DATA1 stores a digital signature SIG1, a public key PKC2 for certification of the adjacently lower data region DATA2, a chip unique reference password PW1 that the motherboard manufacturer exclusively sets for a corresponding system manufacturer with respect to the data region DATA1, and a data region identity BL1 dedicated to the corresponding system manufacturer with respect to the data region DATA1. The digital signature SIG1 is generated by encrypting an entire block of the data region DATA1 using an exclusive proprietary private key of the system manufacturer and then provided to the motherboard manufacturer. Further, when verifying certification of the data region DATA1, after having confirmed certification of the digital signature SIGH, the system manufacturer asks the data region HASH for the public key PKC1, and utilizes the public key PKC1 to process the digital signature SIG1, so as to confirm certification of the digital signature SIG1 of the data region DATA1 is in fact established on the digital signature SIGH of the data region HASH. The private key that generates the digital signature SIG1 and the public key PKC1 are a pair of mutually exclusive keys. Similarly, the data region DATA1 stores a digital signature SIG2, a public key PKC3 corresponding to certification of the adjacently lower data region, a chip unique reference password PW2, and a data region identity BL2 corresponding to the data region DATA2. The data region DATAN stores a digital signature SIGN, a public key PKC(N−1), a chip unique password PWN, and a data region identity BLN corresponding to the data region DATAN. As the data region DATAN is not associated with certification of an adjacently lower data region in the flash memory 120, the data region DATAN does not need to include a public key corresponding to another data region.

As explained, for the data regions HASH, DATA1, DATA2, . . . , and DATAN, the digital signature authentication is sequential and certification is transitive. For example, when the system manufacturer wishes to update data in the data region DATA1, the public key PKC1 is first fetched from the data region HASH to decrypt the digital signature SIG1 in the data region DATA1, so as to verify whether certification of the digital signature SIG1 is in fact established on the digital signature SIGH stored in the data region HASH, and to further update the data in the data region DATA1 through the verified certification of the digital signature SIG1. Similarly, when the system manufacturer wishes update data in the data region DATA2, the system manufacturer first fetches the public key PKC2 from the data region to decrypt the digital signature SIG2 stored in the data region DATA2, so as to verify whether certification of the digital signature SIG2 is in fact established on the digital signature SIG1 stored in the data region DATA1, and to further update the data in the data region DATA2 through the verified certification of the digital signature SIG2. In short, certification for data update of the data region DATA1 is established on certification of the data region HASH, the data update certification of the data region DATA2 is sequentially established on certification of the data regions HASH and DATA1, and the data update certification of the data region DATAN is established on the sequential and transitive certification of all other data regions.

The chip 110 stores a public key PKC published by the motherboard manufacturer and a device identity D_id of the motherboard control module 100. For different motherboards of the same model, the device identities of these motherboards are also different and unique. The controller 130 determines whether to deactivate a digital signature authentication mechanism of the flash memory 120 according to a message provided by the chip 110 and to authorize debugging. The motherboard control module 100 is further connected to a database 140 that stores a plurality of chip unique passwords. Each of the chip unique passwords corresponds to a pair of identities, which are the device identity D_id of the motherboard control module 100 and the data region identity of a data region in the flash memory 120. As such, when entering the device identity D_id and the data region identity for querying the database 140, the corresponding chip unique password can be obtained. When establishing the chip unique passwords stored in the database 140, each chip unique password is at the same time stored in a corresponding data region to serve as the chip unique reference password of that data region for further characteristic comparison. Referring to FIG. 1, the chip unique reference passwords VPKH, PW1, PW2, . . . , and PWN are pre-stored into respectively data regions under the above conditions. In an embodiment of the present invention, the database 140 may comprise a set of record in the table below, in which the columns represents an index of the device identity, the row represents an index of the data region identity, and the value in each field represents a chip unique password.

|  | data region identity | | | | |
| --- | --- | --- | --- | --- | --- |
| device identity | C_id | BL1 | BL2 | ... | BLN |
| D_id | VPKC | PW1C | PW2C | ... | BLNC |

When querying the database 140 using the device identity D_id and the data region identity BL2, the chip unique password PW2C corresponding to the device identity D_id and the data region identity BL2 can be obtained.

An operation mechanism of the controller 130 according to an embodiment is described in detail with reference to FIG. 1.

When the motherboard manufacturer attempts to deactivate the digital signature authentication mechanism of the flash memory 120 and to activate debugging of the flash memory 120, the controller 130 first accesses the device identity D_id of the motherboard control module 100, and, by using of the device identity D_id and the data region identity C_id of data region HASH to be checked as indices, queries the database 140 for a chip unique password VPKC corresponding to the motherboard control module 100 and the data region HASH. In another embodiment, other data regions may be used as the index instead of the data region HASH in the above example. After obtaining the chip unique password VPKC, the controller 130 enters the chip unique password VPKC into the data region HASH to compare whether a characteristic of the chip unique password VPKC matches a chip unique reference password VPKH stored in the data region HASH. When the characteristic of the chip unique password VPKC matches the chip unique reference password VPKH, the controller 130 deactivates the digital signature authentication mechanism of the flash memory 120 to authorize the execution of debugging of the flash memory 120. When the characteristic of the chip unique password VPKC does not match the chip unique reference password VPKH, the controller 130 keeps the digital signature authentication mechanism of the flash memory 120 activated, such that the execution of debugging of the flash memory 120 remains determined according to the validity of the digital signature. In an embodiment of the present invention, in the comparison of the characteristic of the chip unique password VPKC and the chip unique reference password VPKH, bits of the chip unique password VPKC may be sequentially compared with bits of the chip unique reference password VPKH to verify whether the bits of the two passwords are identical.

After having verified the match of the characteristic of the chip unique password VPKC and the chip unique reference password VPKH stored in the data region HASH as well as having deactivated the authentication mechanism of the flash memory 120, instead of depending on the sequential and transitive certification of the digital signatures SIGH, SIG1, SIG2, . . . , and SIGN, certification of the flash memory 120 is established on certification of the chip unique password VPKC when executing debugging of the flash memory 120. Based on the transitive certification of the above data regions, rather than repeatedly performing additional comparisons on chip unique passwords, certification on the later debug function for the other data regions DATA1, DATA2, . . . , and DATAN is also similarly established on certification of the chip unique password VPKC. Further, the comparison procedure of the present invention is quite simple. Without involving complicated and risky procedures, such as replacing unauthenticated chips as in the prior art or additionally requesting for a private key from the system manufacturer, certification of the flash memory can be solidly established through simply generating required chip unique passwords and storing the chip unique passwords into the database 140 established by the motherboard manufacturer.

In the process of the controller 130 obtaining the chip unique password VPKC from the database 140 through query and comparing the characteristic of the chip unique password VPKC with the chip unique reference password VPKH stored in the data region HASH, according to an embodiment of the present invention, the controller 130 may decrypt the chip unique password VPKC by a predetermined encryption algorithm and compare the encrypted chip unique password with the chip unique reference password VPKH. In the above approach, when generating the chip unique reference password VPKH to the database 140 and recording the chip unique reference password VPKH to the data region HASH, the chip unique reference password VPKH is also encrypted using the same encryption algorithm. In other words, in the embodiment, the encryption algorithm for encrypting the chip unique reference password is known by both of the chip 110 and the flash memory 120.

Figure 2:
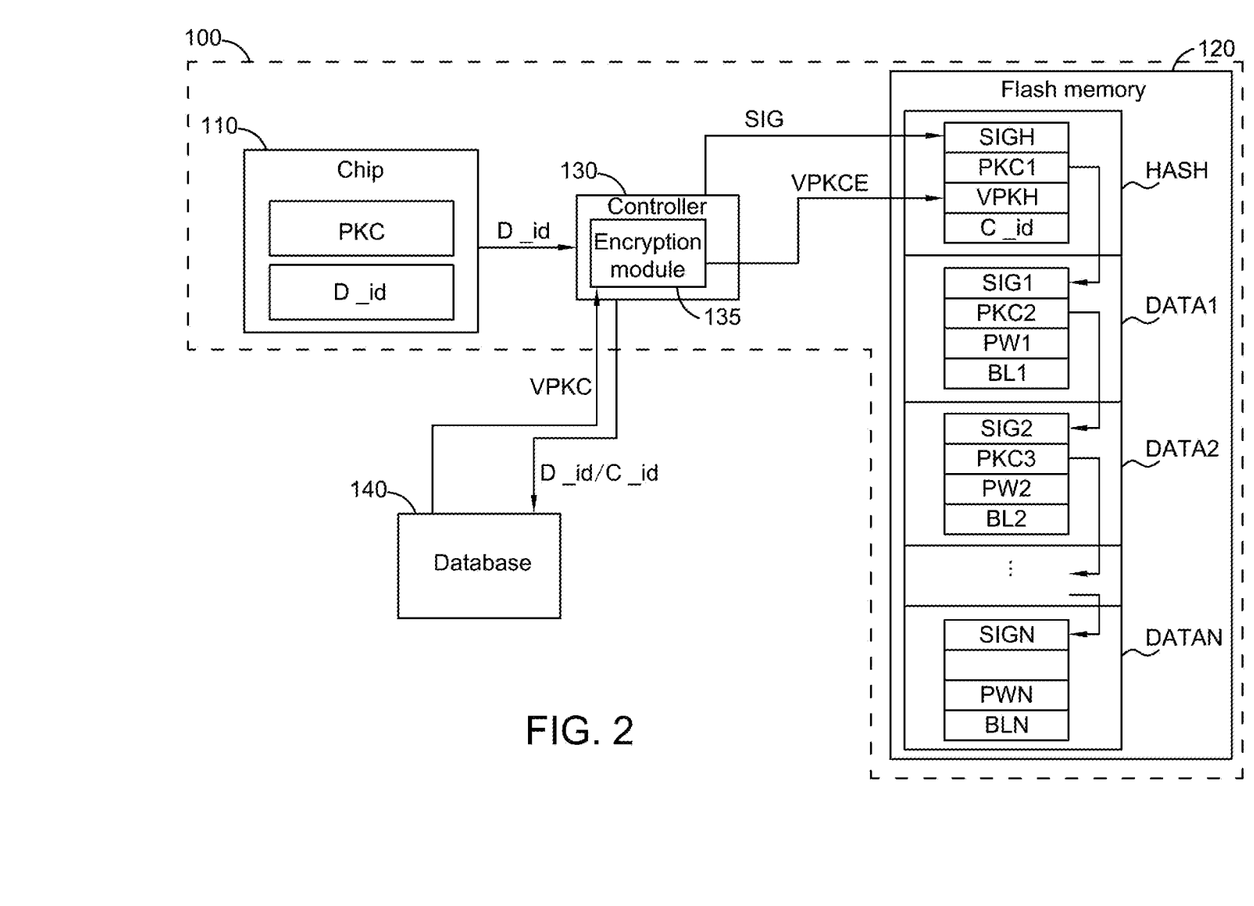

FIG. 2 shows a schematic diagram of the controller 130 in FIG. 1 comparing an encrypted chip unique password with a chip unique reference password in the flash memory 120 to determine whether to deactivate a digital signature authentication mechanism of the flash memory 120 and to authorize the execution of debugging of the flash memory 120 according to an embodiment of the present invention. A main difference between FIG. 2 and FIG. 1 is that, after the controller 130 obtains the chip unique password VPKC through querying the database 140 by using the device identity D_id and the data region identity C_id as indices, the chip unique password VPKC needs to be encrypted by an encryption module 135 of the controller 130 using a predetermined encryption algorithm to generate an encrypted chip unique password VPKCE. The encrypted chip unique password VPKCE is then entered into the data region HASH, and compared with the chip unique password VPKH stored in the data region HASH. Debugging of the flash memory 120 is authorized for execution when the two passwords match. In the embodiment, the chip unique reference password VPKH is encrypted by a predetermined encryption algorithm and stored to the data region HASH.

In an embodiment of the present invention, the encryption algorithm used in the embodiment in FIG. 2 is a Direct Memory Access (DMA) mechanism supported by Advanced Encryption Standard (AES).

Compared to the embodiment in FIG. 1, the chip unique password in the embodiment in FIG. 2 undergoes an additional encryption process, and so the flash memory 120 is offered with better security and certification for the execution of debugging.

In an embodiment of the present invention, when the motherboard manufacturer wishes to execute debugging on the flash memory 120, apart from obtaining certification required for the execution of debugging through the comparison result of the chip unique password, debugging can only be performed also with an agreement of the system manufacturer.

Figure 3:
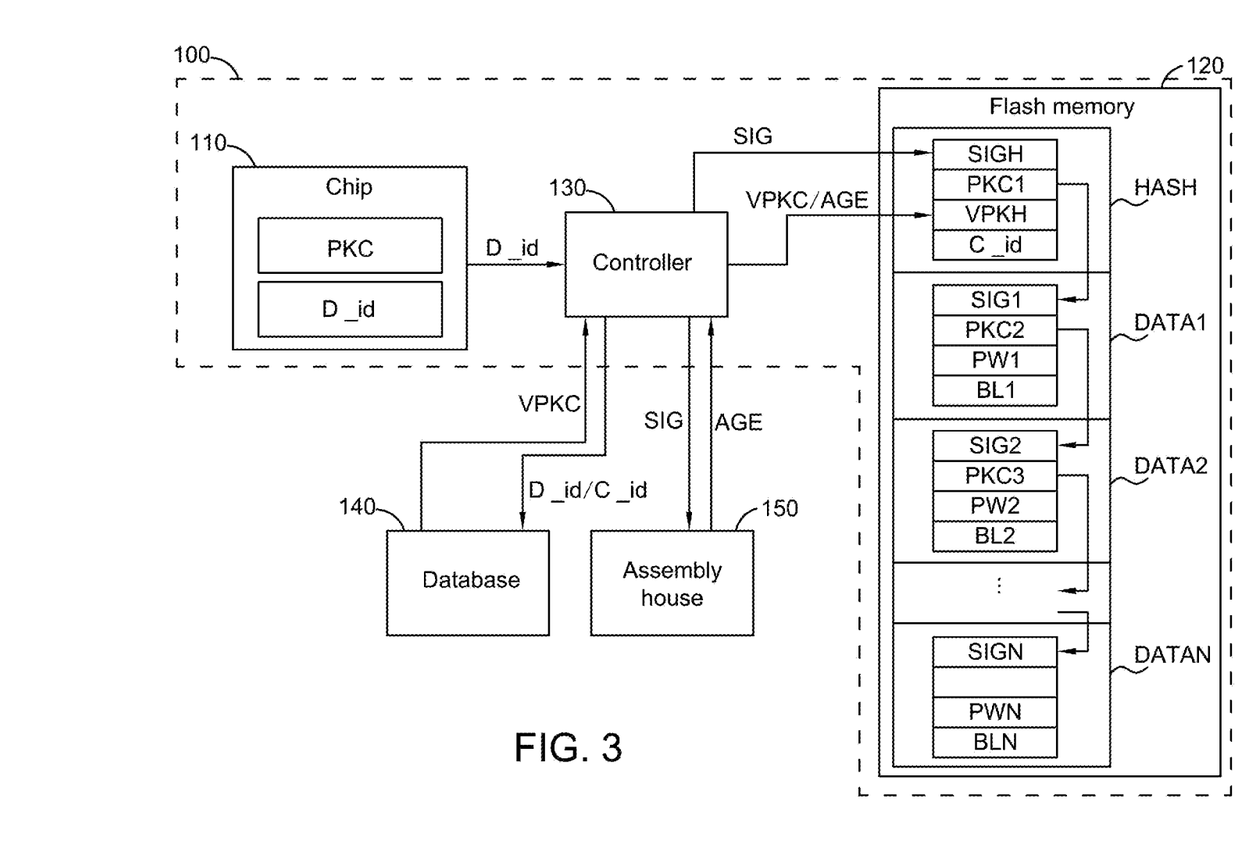

FIG. 3 shows a schematic diagram of the controller 130 in FIG. 1 additionally obtaining an agreement for the execution of debugging from a corresponding system manufacturer 150 (e.g., an assembly house in FIG. 3) when comparing the chip unique password according to an embodiment of the present invention. A main difference between the embodiment in FIG. 3 and the embodiment in FIG. 1 is that, on top of verifying the characteristic match of the chip unique password VPKC obtained from the database 140 and the chip unique reference password VPKH stored in the database region HASH, the controller 130 needs to further encrypt the entire block of the data region HASH by a private key, exclusive proprietary to the motherboard manufacturer and corresponding to the data region HASH, to generate a digital signature SIG and to send the digital signature SIG to the system manufacturer 150. The system manufacturer 150 possesses a public key PKC previously published by the motherboard manufacturer, and is thus capable of decrypting the digital signature SIG by the public key PKC to verify that the digital signature SIG is in fact provided by the motherboard manufacturer. If the system manufacturer 150 agrees the motherboard manufacturer to execute debugging of the flash memory 120, the system manufacturer 150 replies a debug approval AGE to the controller 130. As such, with the chip unique password VPKC matching the chip unique reference password VPKH stored in the data region HASH as well as the received debug approval AGE, the controller 130 is then allowed to deactivate the digital signature authentication mechanism of the flash memory 120 to authorize the execution of debugging of the flash memory 120.

A main feature of the embodiment in FIG. 3 is that, whether the digital signature authentication mechanism of the flash memory 120 is to be deactivated is determined by both the comparison result of the chip unique password and the approval of the system manufacturer. That is, the system manufacturer 150 is offered with an additional chance of deciding whether to authorize the execution of debugging of the flash memory 120.

Figure 4:
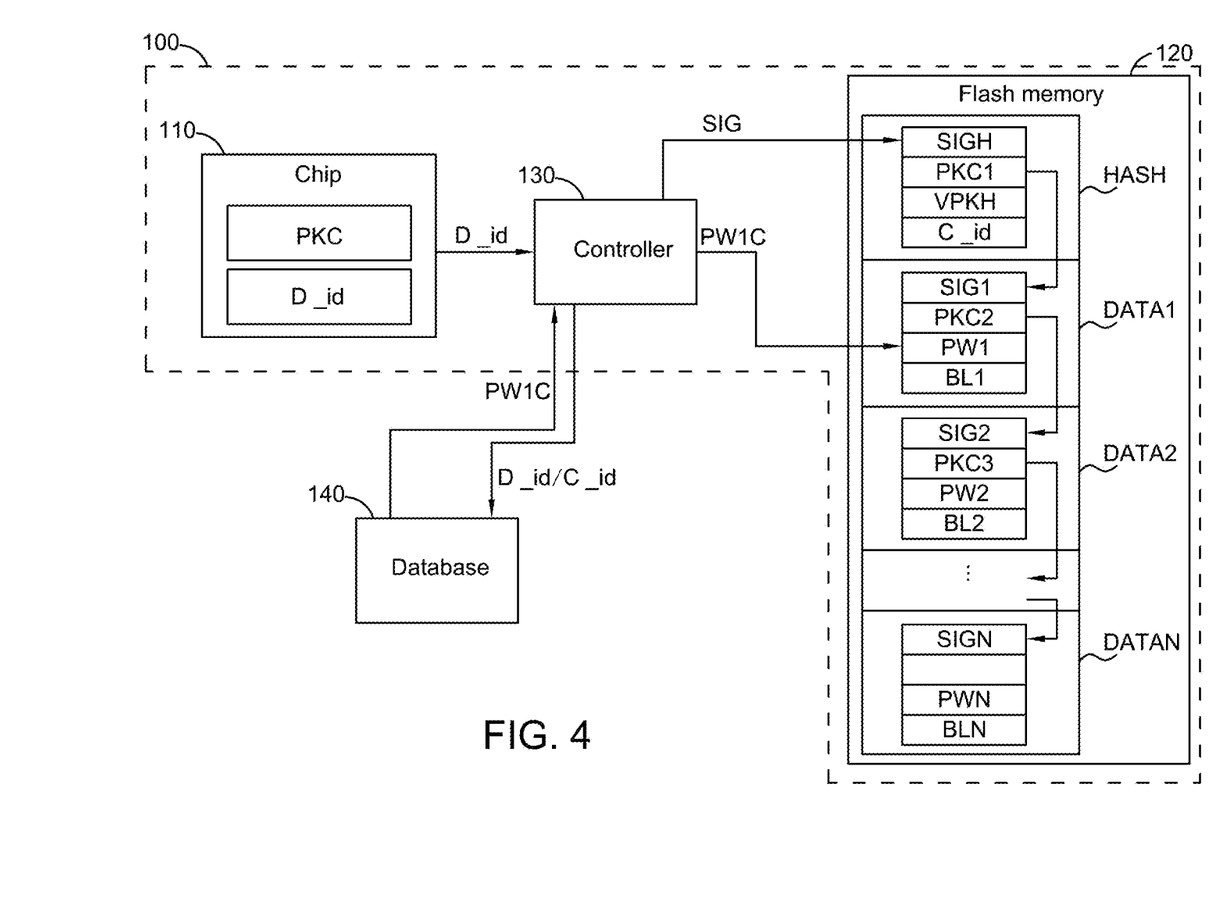

The data region HASH is utilized as a subject for comparing the chip unique password in the above embodiments. In an alternative embodiment of the present invention, arbitrary data region in the flash memory 120 may be selected as the subject for comparing the chip unique password. FIG. 4 shows a schematic diagram of operations of the controller 130 when another data region apart from the data region HASH selected in FIG. 1 is utilized for comparing the chip unique password according to an embodiment of the present invention. A main difference between the embodiment in FIG. 4 and the embodiment in FIG. 1 is that, the data region DATA1 instead of the data region HASH is selected for comparing the chip unique password. As shown in FIG. 4, the motherboard manufacturer wishes to execute debugging of the flash memory 120 after a system manufacturer corresponding to the data region DATA1 completes an assembly process of the motherboard control module 100. The controller 130 may select the data region DATA1 for comparing the chip unique password. Under the above premises, the controller 130 queries the database 140 by using the device identity D_id of the motherboard control module 100 and the data region identity BL1 of the data region DATA1 as query indices to obtain the chip unique password PW1C corresponding to the device identity D_id and the data region identity BL1. The controller 130 then enters the chip unique password PW1C to the data region DATA1 to compare the characteristic of the chip unique password PW1C with the chip unique reference password PW1 stored in the data region DATA1. The controller 130 further deactivates the digital signature authentication mechanism of the flash memory 120 to authorize the execution of debugging of the flash memory 120 when the comparison shows a matching result, or else keeps the digital signature authentication mechanism activated when the comparison shows a non-matching result. Similarly, without repeatedly performing characteristic comparison on the chip unique password of other data regions, the subsequent debug function can be directly executed after completing the comparison of the chip unique password using the data region DATA1 as the subject.

Further, assuming the data region DATA1 is selected as the subject for comparing the chip unique password in the embodiment in FIG. 3, a target that the system manufacturer 150 determines whether to deactivate the digital signature authentication mechanism changes from the data region HASH to the data region DATA1, and the digital signature that the controller 130 sends to the system manufacturer 150 is the digital signature SIG1 rather than the digital signature SIG.

Figure 5:
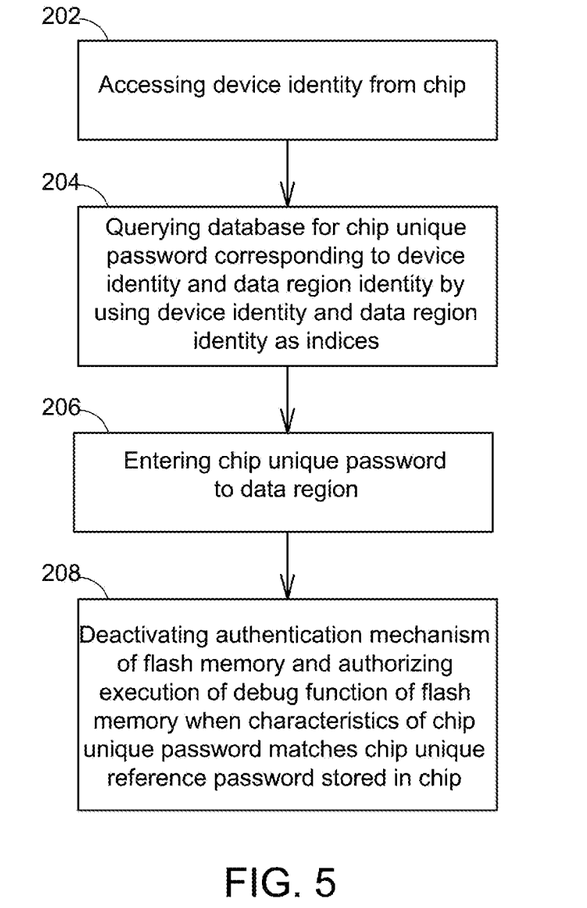
FIGS. 5 to 6 are flowcharts of a method for determining debug authorization for a motherboard control module according to embodiments of the present invention.

FIG. 5 shows a flowchart of a method for determining debug authorization for a motherboard control module according to an embodiment of the present invention. The process in FIG. 5 is applicable to the embodiments in FIGS. 1, 2 and 4. The method in FIG. 5 includes the steps below.

In step 202, a chip 110 accesses a device identity D_id.

In step 204, a database 140 is queried by utilizing the device identity D_id and a data region identity (C_id or BL1) of a data region (HASH or DATA1) as query indices to obtain a chip unique password (VPKC or PW1C) corresponding to the device identity D_id and the data region identity.

In step 206, the chip unique password is entered into the data region.

In step 208, when a characteristic of the chip unique password matches a chip unique reference password stored in the data region, a digital signature authentication mechanism of a flash memory 120 is deactivated and debugging of the flash memory 120 is authorized for execution.

Figure 6:
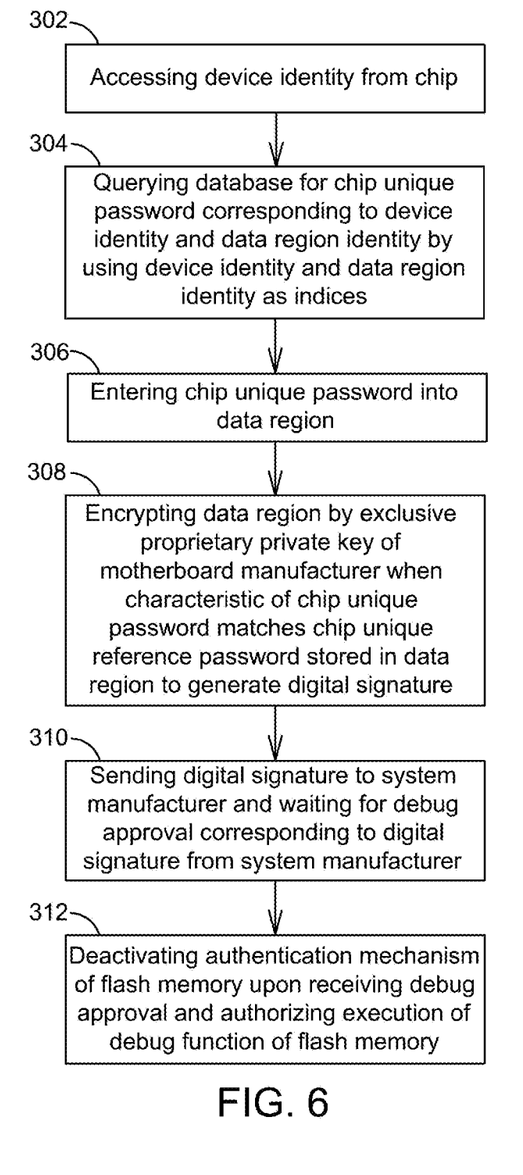

FIG. 6 shows a flowchart of a method for determining debug authorization for a motherboard control module according to an embodiment of the present invention. The process in FIG. 6 is applicable to the embodiments in FIGS. 2, 3 and 4. A main difference to the process in FIG. 5 is that, a debug approval sent from a system manufacturer is required as a criterion for determining whether to deactivate a digital signature authentication mechanism of a flash memory. The method in FIG. 6 includes the steps below.

In step 302, a chip 110 accesses a device identity D_id.

In step 304, a database 140 is queried by utilizing the device identity D_id and a data region identity (C_id or BL1) of a data region (HASH or DATA1) as query indices to obtain a chip unique password (VPKC or PW1C) corresponding to the device identity D_id and the data region identity.

In step 306, the chip unique password is entered into the data region.

In step 308, when a characteristic of the chip unique password matches a chip unique reference password stored in the data region, the data region is encrypted by an exclusive proprietary private key of the motherboard manufacturer to generate a digital signature SIG.

In step 310, the digital signature SIG is sent to a system manufacturer 150, and a debug approval AGE corresponding to the digital signature SIG replied from the system manufacturer 150 is waited for.

In step 312, upon receiving the debug approval AGE, a digital signature authentication mechanism of a flash memory 120 is deactivated and a debug function of the flash memory is authorized for execution.

It should be noted that, embodiments containing logical arrangements, combinations and variations derived from all the abovementioned conditions of the processes in FIGS. 5 and 6 are encompassed within the scope of the disclosure.

With the method for determining debug authorization for a motherboard control module and a motherboard control module using the method as disclosed, a chip unique password apart from a digital signature is adopted for comparison in a way that certification for activating debugging can be established on the chip unique password instead of depending on the digital signature. Thus, even when the chip unique password is lost due to negligence or other unexpected reasons, not only certification for activating debugging for other motherboards of the same model remain unaffected, but also risks caused by replacing the chip as in the prior art a private key leakage by a system manufacturer can be prevented.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for determining debug authorization for a motherboard control module, the motherboard control module comprising a chip and a flash memory, the chip storing a device identity of the motherboard control module, the flash memory comprising a plurality of data regions; the method comprising:
    obtaining a corresponding chip unique password according to the device identity and a data region identity of a first data region of the data regions; and
    comparing a characteristic of the chip unique password with a first chip unique reference password stored in the first data region, encrypting the first data region when the characteristic of the chip unique password matches the first chip unique reference password to generate a digital signature, and, upon receipt of a debug approval from an entity to which the digital signature is sent, deactivating a digital signature authentication mechanism to authorize an execution of debugging of the flash memory,
    wherein when the digital signature authentication mechanism is deactivated, the execution of debugging of any of the data regions is authorized.

2. The method according to claim 1, wherein the step of comparing the characteristic of the chip unique password with the first chip unique reference password comprises:
    authorizing the execution of debugging when the chip unique password is identical to the first chip unique reference password.

3. The method according to claim 1, further comprising:
    after obtaining the chip unique password, encrypting the chip unique password by an encryption algorithm to generate an encrypted chip unique password;
    wherein, the characteristic of the chip unique password is the encrypted chip unique password.

4. The method according to claim 3, wherein when the characteristic of the chip unique password matches the first chip unique reference password, the step of deactivating the digital signature authentication mechanism to authorize the execution of debugging of the flash memory comprises:
    authorizing the execution of debugging when the encrypted chip unique password is identical to the first chip unique reference password.

5. The method according to claim 1, further comprising:
    encrypting the first data region by an exclusive proprietary private key of a motherboard manufacturer of the motherboard control module to generate a digital signature;
    sending the digital signature to the first data region; and
    decrypting the digital signature by a public key corresponding to the first data region in the first data region to verify certification of the digital signature;
    wherein, the public key and the private key are a pair of mutually exclusive keys.

6. The method according to claim 1, wherein the chip unique password is stored in a database provided by a motherboard manufacturer of the motherboard control module.

7. A method for determining debug authorization for a motherboard control module, the motherboard control module comprising a chip and a flash memory, the chip storing a device identity of the motherboard control module, the flash memory comprising a plurality of data regions; the method comprising:
    obtaining a corresponding chip unique password according to the device identity and a data region identity of a first data region of the data regions; and
    comparing a characteristic of the chip unique password with a first chip unique reference password stored in the first data region, and encrypting the first data region by an exclusive proprietary private key of a motherboard manufacturer when the characteristic of the chip unique password matches the first chip unique reference password to generate a digital signature;
    sending the digital signature to a system manufacturer, and waiting to receive a debug approval corresponding to the digital signature from the system manufacturer; and
    upon receiving the debug approval, deactivating a digital signature authentication mechanism of the flash memory to authorize an execution of a debug function of the flash memory.

8. The method according to claim 7, wherein the step of comparing the characteristic of the chip unique password with the first chip unique reference password comprises:

utilizing the chip unique password to generate the digital signature when the chip unique password is identical to the first chip unique reference password.

9. The method according to claim 7, further comprising:
after obtaining the chip unique password, encrypting the chip unique password by an encryption algorithm to generate an encrypted chip unique password;
wherein, the characteristic of the chip unique password is the encrypted chip unique password.

10. The method according to claim 9, when the characteristic of the chip unique password matches the first chip unique reference password, the step of encrypting the first data region by the exclusive proprietary private key of the motherboard manufacturer to generate the digital signature comprises:
encrypting the first data region by the exclusive proprietary private key of the motherboard manufacturer of the motherboard control module when the encrypted chip unique password is identical to the first chip unique reference password to generate the digital signature.

11. The method according to claim 7, wherein the encryption algorithm is a Direct Memory Access (DMA) mechanism supported by Advanced Encryption Standard (AES).

12. The method according to claim 7, further comprising:
sending the digital signature to the first data region; and
decrypting the digital signature by a public key corresponding to the first data region in the first data region to verify certification of the digital signature;
wherein, the public key and the private key are a pair of mutually exclusive keys.

13. The method according to claim 7, wherein the chip unique password is stored in a database provided by the motherboard manufacturer.

14. The method according to claim 1, wherein debugging is not authorized for execution when the digital signature authentication mechanism is activated.

15. A motherboard control module, comprising:
a chip, storing a device identity of the motherboard control module; and
a flash memory, comprising a plurality of data regions; and
a controller, configured to access the device identity, obtain a corresponding chip unique password according to the device identity and a data region identity of a first data region of the data regions, compare a characteristic of the chip unique password with a first chip unique reference password stored in the first data region, encrypt the first data region by an exclusive proprietary private key of a manufacturer of the motherboard control module when the characteristic of the chip unique password matches the first chip unique reference password to generate a digital signature, enable the digital signature to be sent to a system manufacturer, wait to receive a debug approval corresponding to the digital signature from the system manufacturer, and upon receiving the debug approval, deactivate a digital signature authentication mechanism of the flash memory to authorize an execution of a debug function of the flash memory.

16. The motherboard control module according to claim 15, wherein the controller further authorizes the execution of debugging when the chip unique password is identical to the first chip unique reference password.

17. The motherboard control module according to claim 15, wherein, after obtaining the chip unique password, the controller further encrypts the chip unique password by an encryption algorithm to generate an encrypted chip unique password; and the characteristic of the chip unique password is the encrypted chip unique password.

18. The motherboard control module according to claim 17, wherein the controller authorizes the execution of debugging when the encrypted chip unique password is identical to the first chip unique reference password.

19. The motherboard control module according to claim 15, wherein the controller further, sends the digital signature to the first data region, and decrypts the digital signature by a public key corresponding to the first data region in the first data region to verify certification of the digital signature; the public key and the private key are a pair of mutually exclusive keys.

20. The motherboard control module according to claim 15, wherein the chip unique password is stored in a database provided by a motherboard manufacturer of the motherboard control module.

* * * * *